Oct. 1, 1968     J. J. RATAICZAK     3,403,482
ADAPTER APPARATUS FOR RESIZING PISTONS
Filed Feb. 25, 1966
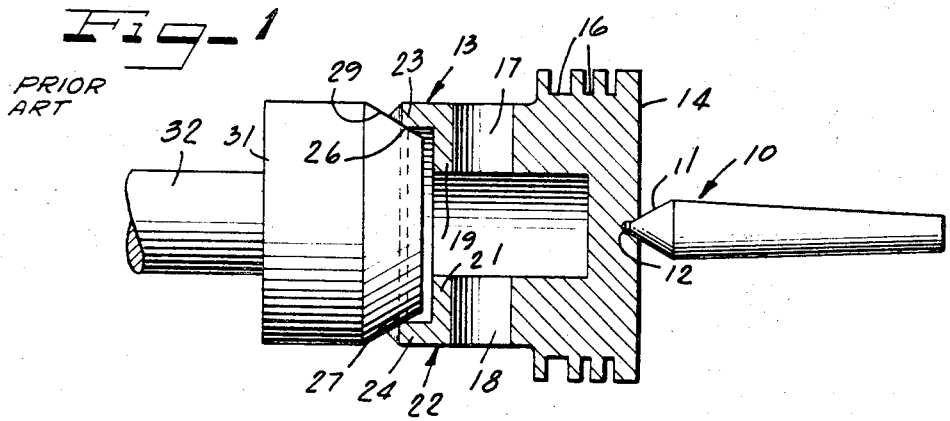
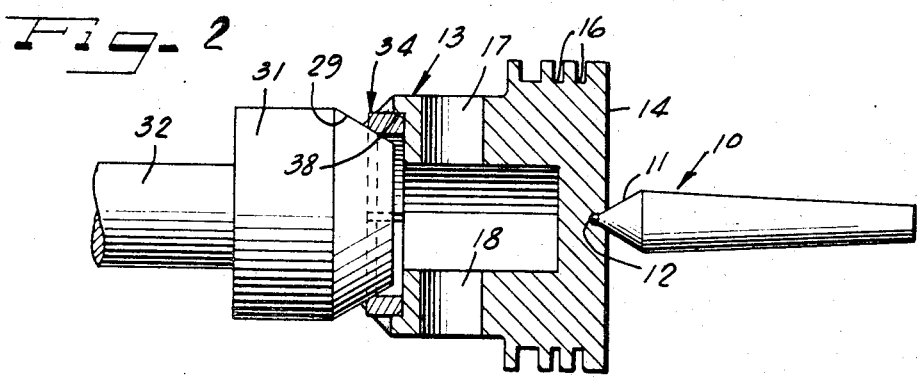
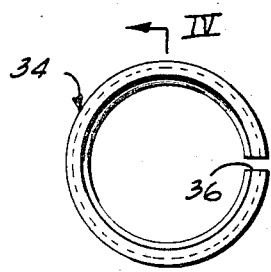
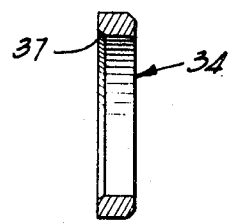
INVENTOR.
JAMES J. RATAICZAK
BY    Hill, Sherman, Meroni, Gross & Simpson
                                ATTORNEYS

United States Patent Office 3,403,482
Patented Oct. 1, 1968

3,403,482
ADAPTER APPARATUS FOR RESIZING PISTONS
James J. Rataiczak, Chagrin Falls, Ohio, assignor to TRW Inc., Cleveland, Ohio, a corporation of Ohio
Filed Feb. 25, 1966, Ser. No. 530,180
2 Claims. (Cl. 51—227)

ABSTRACT OF THE DISCLOSURE

An adapter for positioning a counterbored piston on a metal working machine having a tapered holding fixture comprising a ring having a transverse gap therein, the ring having a chamfered peripheral edge on one side arranged to mate with the taper of the tapered holding fixture, and having an outer diameter substantially the same as the diameter of the counterbore of the piston.

The present invention relates to a method and apparatus for positioning a piston on a metal working machine such as, for example, a grinder, a lathe, or the like.

When pistons are processed to size them for an engine, they are often mounted in a grinding machine or the like having a centering device engaging the exact center of the head portion of the piston, and a tapered holding fixture seated along chamfered balance pads formed at the ends of the skirt portion of the piston. After sizing, the balance pads are machined off.

It would be highly desirable to be able to resize previously formed pistons to a smaller size for use in a different engine cylinder bore size. With the removal of the chamfered balancing pads, however, the piston is non-amenable for positioning on conventional grinding fixtures or other metal working equipment. The present invention provides a means for positioning such a piston on conventional equipment, enabling the piston to be cut down to a smaller size if that should become desirable.

One object of this invention is to provide an adapter which can be used with conventional metal working equipment so that those pistons that have the grinding adapter chamfer removed can be resized.

Another object of the invention is to provide a removable adapter which enables one to position a piston on a grinder or the like despite the absence of chamfered engaging surfaces on the piston.

The fixturing device of the present invention includes a conventional centering means, and a conventional tapered holding fixture coaxial with and spaced from the centering means. In order to adapt this type of fixturing to a non-chamfered skirt of a piston, I provide an adapter removably mounted on the tapered holding fixture, and having a chamfered seating surface matching the taper of the tapered holding fixture whereby the adapter may be seated within the counterbore of a piston, with its chamfered peripheral surface properly engaging the tapered nose of the holding fixture. In order to provide for a tight engagement of the adapter within the counterbore of the piston, the adapter is provided with a transverse gap so that it may snap into seated relation within the counterbore of the piston.

A further description of the present invention will be made in conjunction with the attached sheet of drawings in which:

FIGURE 1 is a fragmentary view partly in elevation and partly in cross-section illustrating the manner in which a piston is mounted according to present practice during grinding;

FIGURE 2 is a view similar to FIGURE 1, illustrating the manner in which a piston without balancing pads is mounted on the grinding assembly in accordance with the present invention;

FIGURE 3 is a view in elevation of the adapter of the present invention; and

FIGURE 4 is a cross-sectional view taken substantially along the line IV—IV of FIGURE 3.

As shown in the drawings:

In FIGURE 1, reference numeral 10 indicates generally a centering means such as a tailstock center of a conventional grinding machine, having a conical nose portion 11 arranged to be received within a socket 12 formed on the exact center of the piston to be ground. The piston is illustrated generally at reference numeral 13 and may include a head portion 14 and conventional ring grooves 16. The piston 13 includes conventional wrist pin bores 17 and 18 formed within opposed wrist pin bosses 19 and 21 respectively.

The skirt portion of the piston 13, indicated at reference numeral 22 includes opposed balancing pads 23 and 24 respectively, each of which is provided with a chamfered peripheral surface 26 and 27 respectively. The chamfered surfaces 26 and 27 are arranged to seat against a tapered nose portion 29 of a grinding holding fixture 31 mounted on a spindle 32.

After the piston has been ground utilizing the fixturing of the type shown in FIGURE 1, the piston is removed and the balancing pads 23 and 24 are machined off, leaving a skirt portion which can no longer be properly mounted on the holding fixture 31. Consequently, if it becomes desirable to cut down the size of the piston to a size which is commercially more attractive, the cut down cannot be accomplished on conventional metal working equipment.

To overcome this difficulty, I interpose an adapter 34 of the type shown in FIGURES 3 and 4 between the holding fixture 31 and the counterbored skirt end of the piston 13, as illustrated in FIGURE 2. The adapter 34 has a transverse gap 36 provided therein, and has a chamfered peripheral surface 37 with a taper which matches the taper of the conical nose 29 of the holding fixture 31. The outer diameter of the adapter 34 is substantially the same as the diameter of the counterbore of the skirt end of the piston, illustrated at reference numeral 38 in FIGURE 2. The adapter 34 is also made sufficiently resilient so that it can snap into engagement within the counterbore 38 by virtue of its inherent flexibility.

The adapter 34 is seated against the conical nose portion 29 of the fixture 31 as illustrated in FIGURE 2 and is snugly received within the counterbore 38 of the piston skirt. The tailstock center 10 is then positioned along the centerline of the head 14 by seating it in the socket 12. When so mounted, the piston 13 may be ground down or otherwise machined down to the new size.

From the foregoing, it will be understood that the adapter of the present invention permits the pistons to be resized to a smaller size which may be in greater demand than the original larger size. Consequently, inventories of pistons can be reduced by regrinding them when they become outdated or evidence poor sales response.

It should be evident that various modifications can be made to the described embodiments without departing from the scope of the present invention.

I claim as my invention:

1. A fixturing device for mounting a piston which comprises a centering means, a tapered holding fixture coaxial with and spaced from said centering means, a removable adapter mounted on said tapered holding fixture, said adapter having a gap therein and having a chambered seating surface matching the taper of said tapered holding fixture whereby said adapter may be seated within the counterbore of a piston with the head of said piston centered on said centering means.

2. A fixturing device as claimed in claim 1 in which said adapter is proportioned to snap into seated relation within the counterbore of said piston.

References Cited

UNITED STATES PATENTS

| | | |
|---|---|---|
| 1,385,508 | 7/1921 | Trembley. |
| 1,818,085 | 8/1931 | Nelson _____ 51—289 |
| 2,123,165 | 7/1938 | Brown _____ 29—156.5 X |
| 2,221,080 | 11/1940 | Edwin et al. _____ 51—237 |

OTHELL M. SIMPSON, *Primary Examiner.*